United States Patent [19]

Narita et al.

[11] Patent Number: 4,463,249

[45] Date of Patent: Jul. 31, 1984

[54] ELECTRIC RICE COOKER

[75] Inventors: Ryuho Narita, Nagoya; Terutaka Aoshima, Toyohashi, both of Japan

[73] Assignee: Tokyo Shibaura Denki Kabushiki Kaisha, Kawasaki, Japan

[21] Appl. No.: 501,784

[22] Filed: Jun. 7, 1983

[30] Foreign Application Priority Data

Jun. 12, 1982 [JP] Japan ................................ 57-101082

[51] Int. Cl.³ .......................................... F27D 11/02
[52] U.S. Cl. ...................................... 219/441; 99/333; 219/432; 219/433; 219/438; 219/442; 219/492; 219/494
[58] Field of Search ............... 219/429, 430, 432, 433, 219/434, 435, 436, 438, 439, 441, 442, 492, 494, 510, 521; 99/332, 333

[56] References Cited

U.S. PATENT DOCUMENTS

| | | |
|---|---|---|
| 4,241,288 | 12/1980 | Aoshima et al. ..................... 219/441 |
| 4,313,051 | 1/1982 | Aoshima ............................. 219/441 |
| 4,315,138 | 2/1982 | Miva ................................... 219/441 |
| 4,315,139 | 2/1982 | Onishi et al. ....................... 219/441 |
| 4,362,923 | 12/1982 | Aoshima ............................. 219/441 |
| 4,421,974 | 12/1983 | Oota et al. .......................... 219/441 |

FOREIGN PATENT DOCUMENTS

| | | |
|---|---|---|
| 55-143122 | 3/1979 | Japan . |
| 55-122511 | 3/1979 | Japan . |
| 1079032 | 8/1967 | United Kingdom . |

Primary Examiner—Volodymyr Y. Mayewsky
Attorney, Agent, or Firm—Cushman, Darby & Cushman

[57] ABSTRACT

An electric rice cooker is disclosed which has a cooking pot or kettle for containing rice and water, an electrical cooking heater provided adjacent to the outside surface of the kettle for heating the kettle and its contents, a thermal insulating frame structure including a removable lid member, and a kettle temperature measuring device including a thermally sensitive resistor. A connection failure of the thermally sensitive resistor is detected after a specified time interval has lapsed after starting the cooking operation. The detection is carried out in accordance with a decrease in level of the output from the kettle temperature measuring device, thereby stopping the supply of power to the heater and at the same time informing the operator of the connection failure.

9 Claims, 9 Drawing Figures

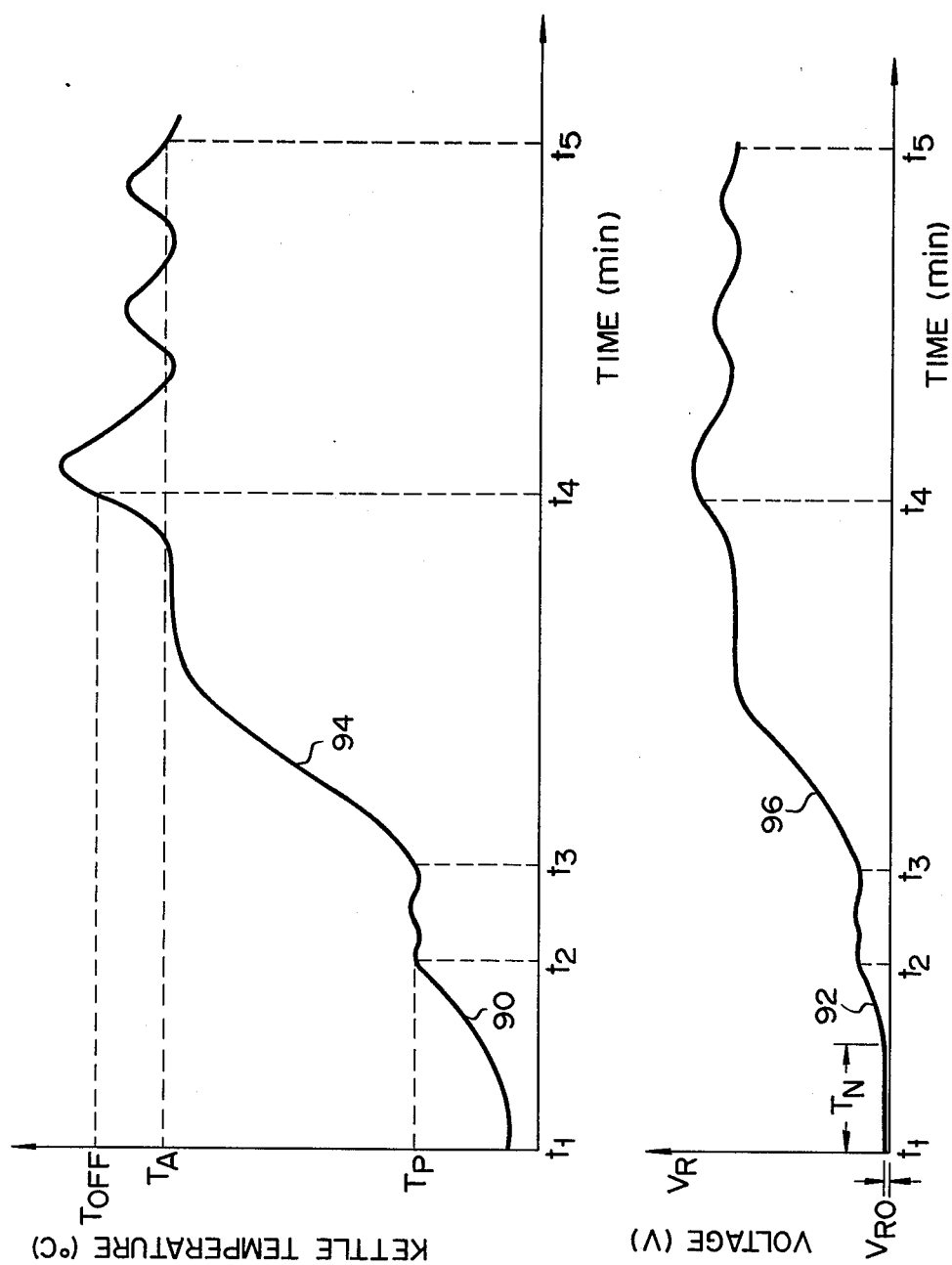

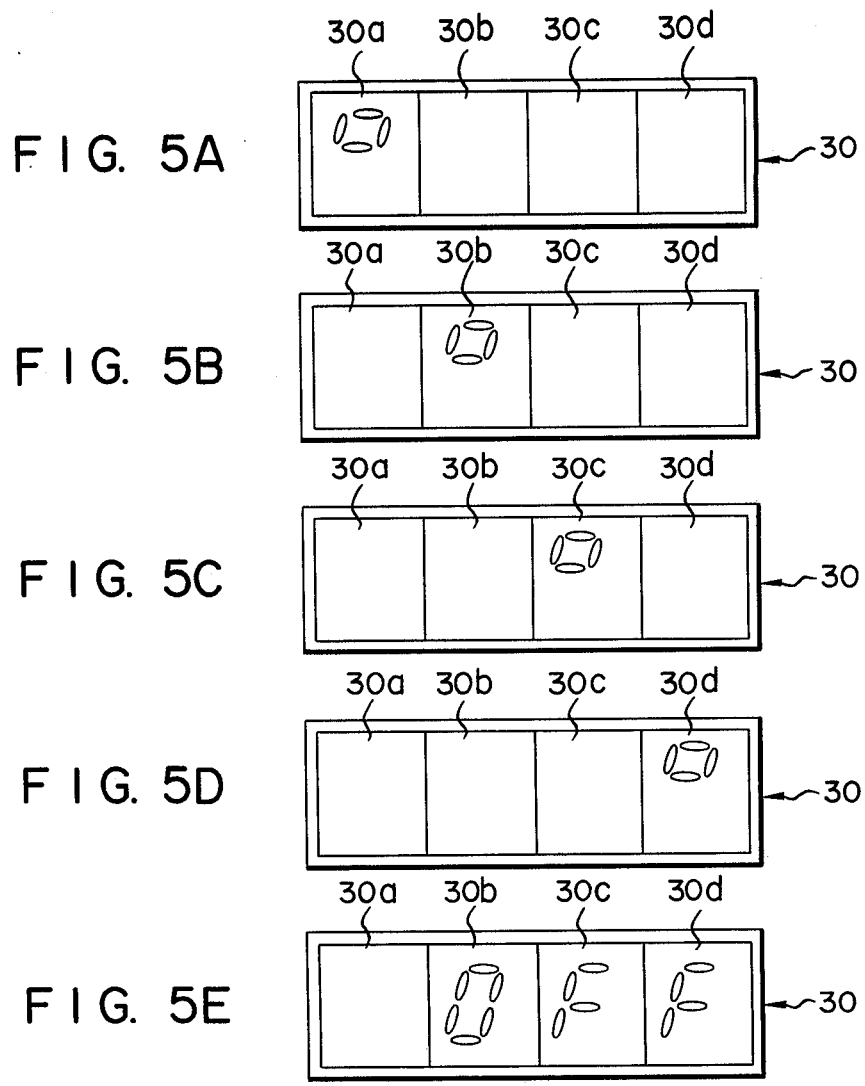

ELECTRIC RICE COOKER

BACKGROUND OF THE INVENTION

The present invention relates to an electric rice cooker and, more particularly, to an electric rice cooker in which the cooking heater is controlled in accordance with the actual kettle temperature measured by a temperature sensor, thereby performing the rice cooking operation.

In a rice cooking machine, or rice cooker, designed to electrically heat the rice introduced, together with an appropriate amount of water, into a cooking kettle and perform its cooking operation on an automatic basis, measuring the actual temperature of the kettle with high precision during the cooking operation is important in performing the rice cooking operation effectively. The measured kettle temperature is utilized as the basis for effectively executing various cooking modes including what is called "twice cooking" which is known to those in the art. As a simple and easily understandable example, this kettle temperature data is used for suitably judging the time for deenergizing the cooking heater in order to complete the main cooking operation. That is, if the heater is deenergized when the actual kettle temperature has reached a goal temperature corresponding to the temperature at which the rice cooking is completed, it is possible to suitably control the duration for the succeeding rice cooking operation and also to reliably prevent scorching due to overheating.

Measuring the actual kettle temperature is generally carried out by an electric temperature sensor such as a thermistor. However, this type of temperature sensor is not reliable and is likely to cause conduction failure making it impossible for a cooking control circuit to effectively control the energization or deenergization of the heater. If the heater continues to heat when the temperature control is rendered ineffective, not only will the rice be scorched, but there will also be an increased risk of causing an electrical accident.

SUMMARY OF THE INVENTION

The object of the present invention is to provide a new and improved safe electric rice cooker capable of detecting with high precision when the temperature sensor used to measure the actual kettle temperature becomes defective and thereby reliably preventing the cooking heater from becoming uncontrolled and overheating.

According to an electric rice cooker of the present invention, there is provided a cooking operation control section connected to a temperature measuring device including a thermally sensitive resistor and also to an electric heater, the control section being adapted to control the power supply to the heater in accordance with the actual measured kettle temperature. An emergency circuit is also provided for detecting a decrease from a specified level of the measurement signal of the temperature measuring device due to an electrical connection failure of the thermally sensitive resistor and, at the time of detection, deenergizing the heater independently of the cooking operation control section. The emergency circuit is constructed such that it performs the detecting and heater-deenergizing operation only after a predetermined length of time has elasped from when the cooking operation started.

BRIEF DESCRIPTION OF THE DRAWINGS

The present invention is best understood by reference to the accompanying drawings, in which:

FIG. 3 is a temperature characteristic curve diagram showing the variation with time of the actual kettle temperature of the rice cooker of FIG. 1;

FIG. 4 is a voltage-variation characteristic curve diagram which illustrates the variation in resistor output voltage (kettle temperature data) obtained in accordance with the resistance value variation of the temperature sensor; and FIGS. 5A to 5E show the different conditions of display attained by a cooking-status display device provided in the rice cooker of FIG. 1.

DETAILED DESCRIPTION OF THE PREFERRED EMBODIMENT

Figure 1:
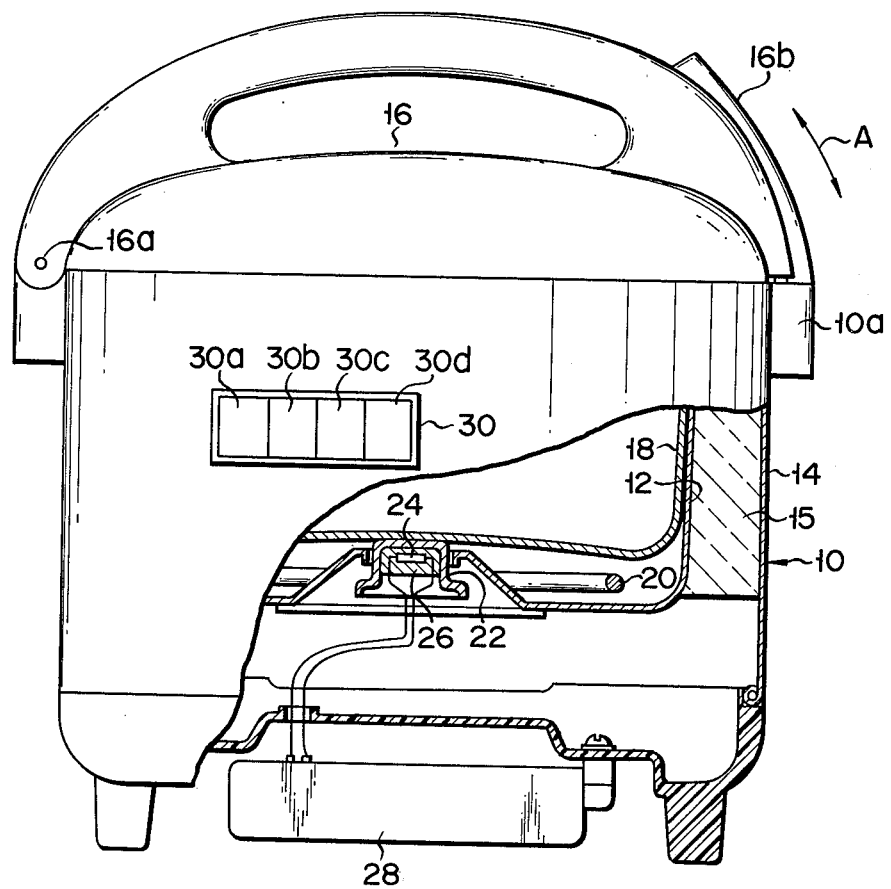
FIG. 1 is a side view schematically illustrating a section of the main part of an electric rice cooker according to a preferred embodiment of the invention.

Referring now to FIG. 1, a main body 10 of an electric rice cooker in accordance with an embodiment of the present invention includes an inner case 12 and an outer case 14. A thermally insulating material 15 is sandwiched between the inner and outer cases 12 and 14. A lid member 16 has also therein a thermally insulating material (not shown in FIG. 1). The lid member 16 is mounted at an upper opening of the main body so that it is swingable or movable, in the directions indicated by arrow A, about a hinge shaft 16a. When the lid member 16 is tightly closed, an engaging member 16b, which is disposed opposite the hinge shaft 16a of the lid member 16, engages an engaging member 10a of the main body 10, thereby keeping the main body 10 tightly closed. The internal space of the main body 10 is substantially insulated from the outside temperature.

A cooking pot or kettle 18 which contains rice (not shown) to be cooked and a proper amount of water (not shown) is removably placed inside the inner case 12 of the main body 10. A cooking heater 20 for heating the kettle 18 is provided at the inner bottom portion of the inner case 12. When the kettle 18 containing rice and water is placed in the main body 10, the cooking heater 20 is located adjacent to the outer surface of the kettle 18 and heats the rice and water contained in the kettle 18.

A cup-shaped heat sensor 22 is disposed substantially at the center of the inner bottom surface of the inner case 12 so that it may be brought into tight and elastic contact with the outer bottom surface of the kettle 18 placed in the inner case 12. The heat sensor 22 has a thermally sensitive resistor (thermistor) 24 which serves as a temperature sensor. The thermistor 24 is stably encapsulated with a molded member 26 which is formed of a highly conductive material. The temperature of the kettle 18 is detected by the heat sensor 22. At this time, the thermistor 24 has its resistance value changed in accordance with this detected temperature. A case 28 is disposed outside and in the vicinity of the outer bottom surface of the outer case 14 of the main body 10 of the rice cooker. The case 28 has a cooking control section. A display device 30 is fixed onto the outer wall surface of the main body 10 and is composed of four display sections 30a, 30b, 30c and 30d, for example, which are horizontally arranged in one row. Each of these display sections 30a, 30b, 30c and 30d has seven display segments each consisting of a light-emitting diode.

Figure 2:
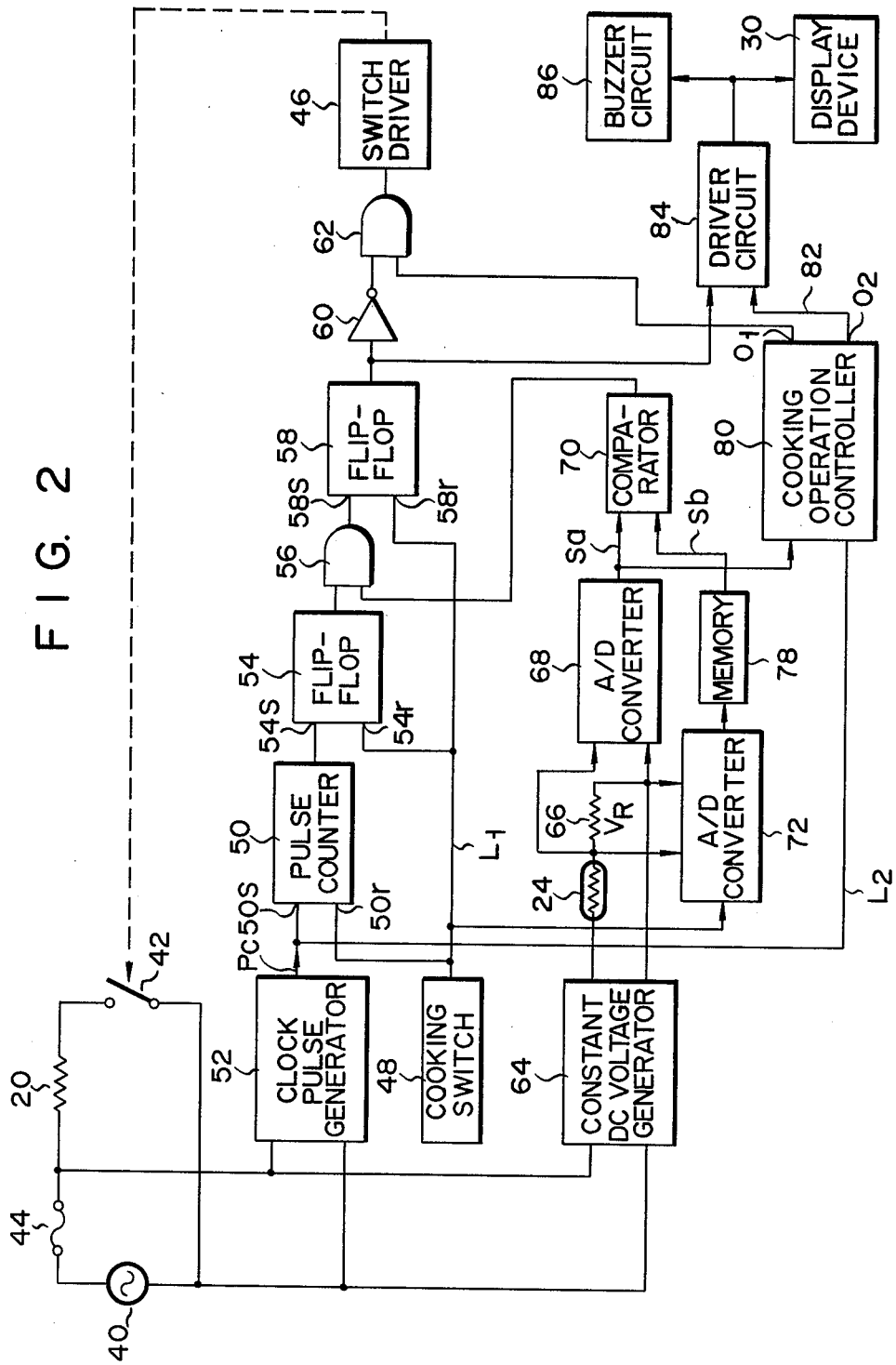
FIG. 2 is a circuit diagram showing the whole construction of a rice cooking operation control circuit provided in the rice cooker shown in FIG. 1.

FIG. 2 shows the cooking control circuit arranged in the case 28 and including an emergency circuit for stopping the supply of power to the heater 20 by detecting the thermistor disconnection. The cooking heater 20 is electrically connected to an AC power source 40 which supplies the heater 20 with an electric AC power via a known plug-receptacle assembly (not shown), a normally-open cooking heater switch 42 and a fuse 44. The cooking heater switch 42 is controlled by a switch driver 46 to become conductive in response to a signal of logic level "1" generated from the switch driver 46.

A cooking start/stop switch 48 (hereinafter referred to as a "cooking switch") is manually operated by an operator. When the operator actuates the cooking switch 48, this switch 48 produces a logic level "1" signal which is supplied to a signal line $L_1$. This line $L_1$ is connected to a reset input terminal 50r of a clock pulse counter 50. The clock pulse counter 50 has a set input terminal 50s which is connected to the output terminal of a clock pulse generator 52 for shaping the waveform of the AC output from the AC power source 40 and frequency-dividing it to produce a clock pulse signal Pc of 1 Hz frequency, for example, according to a known manner. Therefore, the clock pulse counter 50 counting up the clock pulses Pc supplied to the set terminal 50s thereof from the clock pulse generator 52, or the counter 50 adapted to measure the period of time elapsing after the actuation of the cooking switch 48, is reset when the logic level "1" signal is supplied from the cooking switch 48 to the reset input terminal 50r thereof. The pulse counter 50 is so constructed that, when the counted value of the clock pulses supplied thereto from the clock pulse generator 52 has reached a predetermined reference value, it inverts the output from its own output terminal from a logic level "0" to a logic level "1" signal and generates this logic level "1" signal. The reference value represents a predetermined length of time lapsing after the cooking switch 48 has been depressed by the operator, or after the cooking operation has commenced and, in this embodiment, is set at a value corresponding to 3 minutes.

The output signal (the logic level "0" or "1" signal) from the counter 50 is supplied to a set input terminal 54s of an R-S flip-flop 54. The output signal from the cooking switch 48 is supplied through the signal line $L_1$ to a reset input terminal 54r of the R-S flip-flop 54. When the logic level "1" signal or cooking start signal generated from the cooking switch 48 through manual operation of this switch by the operator is supplied to the reset input terminal 54r of the flip-flop 54, this R-S flip-flop 54 is reset to generate a logic level "0" signal from its output terminal. The output terminal of the flip-flop 54 is connected through an AND gate 56 to a set input terminal 58s of another R-S flip-flop 58 which has a reset input terminal 58r to which the above cooking switch 48 is connected through the signal line $L_1$. This flip-flop 58 has the same function as that of the aforementioned flip-flop 54. The output terminal of the flip-flop 58 is connected to the switch driving circuit 46 through an inverter 60 and AND gate 62.

The reference numeral 64 denotes a constant DC voltage generator which receives the AC power from the AC power source 40 to convert it into a constant DC voltage, which is supplied to a series circuit consisting of the thermistor 24 and a resistor 66 serving as a resistor for detecting the thermistor disconnection. The ends of this resistor 66 are connected to an analog-to-digital (A/D) converter 68 which converts the analog output voltage value $V_R$ corresponding to a voltage drop having occurred in the resistor 66 into a digital resistance value and supplies a signal Sa representing the digital resistance value to a first input terminal of a comparator 70.

The ends of the resistor 66 are also connected to input terminals of another A/D converter 72, respectively. The two A/D converters 68 and 72 are each connected to the resistor 66 and also to each other at their mentioned input terminals. The A/D converter 72 is constructed such that it starts its operation in response to the logic level "1" signal generated from the cooking switch 48 when the cooking operation starts and performs its A/D converting operation only at the start of the cooking operation and stops to perform the same at the other time. With this construction, the A/D converter 72 detects the voltage value $V_{R0}$ across the ends of the resistor 66 immediately after the commencement of the cooking operation and supplies digital data representing the cooking-start potential value $V_{R0}$ thus detected to a constant memory 78 composed of, for example, random access memory. The cooking-start resistance value data thus obtained is stored in the memory 78 as a reference value data Sb which is processed by the comparator 70.

When the above-mentioned data signal Sa is supplied to the comparator 70 from the first A/D converter 68, the comparator 70 compares this signal Sa with the reference signal Sb and, where the data value $V_R$ represented by the signal Sa is greater than the primary voltage value $V_{R0}$ represented by the reference signal Sb, generates a logic level "0" signal and, where said data value $V_R$ is equal to or smaller than said primary voltage value $V_{R0}$, generates a logic level "1" signal. The output signal from this comparator 70 is supplied to the AND gate 56.

A cooking operation controller 80 is provided to receive the data signal Sa as the actual kettle temperature data as well as to receive the clock pulse signal Pc generated by the clock pulse generator 52 and supplied thereto through a signal line $L_2$. The cooking operation controller 80 serves to determine the timing of energizing and deenergizing the cooking heater 20 to permit a correct and sequential execution of various steps necessary for the rice cooking process such as a rice immersion step, main cooking step, ripening step (what is called "twice-cooking step") and warming step, in accordance with the actual kettle temperature obtained from the variation in resistance value of the thermistor 24. The controller 80 generates a logic level "1" signal at the first output terminal $O_1$ thereof during the time periods in which the heater 20 is determined to be energized. In this embodiment, the cooking operation controller 80 generates a display control signal 82 from its second output terminal $O_2$ to cause the display device 30 to display the name of the cooking step currently in execution. A driver circuit 84 is provided to receive the output signal from the flip-flop 58 as well as the display control signal 82. The driver circuit 84 is constructed so that, when the output signal from the flip-flop 58 has a logic level "0", it energizes the display device 30 in accordance with the display control signal 82 supplied from the controller 80 and so that, when the output signal from the flip-flop 58 has a logic level "1", it energizes the display 30 so as to obtain a special display (which indicates the occurrence of a connection failure in the thermistor), such as that shown in FIG. 5E. The driver circuit 84 is further constructed so that it drives a buzzer circuit 86, as well, to energize a buzzer (not shown) to inform the operator of the thermistor disconnection.

The mode of operation of the rice cooker with the aforementioned arrangement will now be described. The lid member 16 is closed after the kettle 18, which contains a given amount of rice and an appropriate amount of water, is placed in the main body 10. When the cooking switch 48 is manually operated by the operator at a time $t_1$ of FIG. 3, a logic level "1" signal is supplied from the switch 48 to the signal line $L_1$. By this logic level "1" signal, the pulse counter 50 and R-S flip-flops 54 and 58 are respectively reset to generate logic level "0" signals. Accordingly, the pulse counter 50 has its count value cleared when the cooking operation starts and counter 50 commences its counting operation or its timer operation. When the cooking operation starts, or at the time $t_1$, the temperature of the kettle 18 is substantially as low as room temperature. Accordingly, the primary potential value $V_{R0}$ of the resistor 66 connected in series to the thermistor 24, which is produced from the A/D converter 72, is also low as shown in FIG. 4. This primary potential value $V_{R0}$ is stored in the memory 78 as the reference value data after it is converted by the A/D converter 72 into the digital data Sb.

The cooking operation controller 80 supplies a logic level "1" signal from its first output terminal $O_1$ to one input terminal of the AND gate 62 in accordance with the output signal Sa from the A/D converter 68, which digitally represents the resistance value $V_R$ of the resistor 66 whose terminal voltage is varied to correspond to the resistance value variation of the thermistor 24 arranged electrically to measure the actual kettle temperature. At this time, the AND gate 62 is supplied at its other input terminal with a logic level "1" signal obtained by inverting, through the use of the inverter 60, the logic level "0" signal outputted from the R-S flip-flop circuit 58. Accordingly, the AND gate 62 supplies the logic level "1" signal to the switch driver 46. In response to this signal, the switch driver 46 renders the heater switch 42 conductive. Thus, power is supplied to the cooking heater 20 and the kettle 18 (FIG. 1) is heated. By this heating operation of the heater 20, the kettle temperature rises as shown in FIG. 3 by curve 90. Accordingly, the output voltage $V_R$ of the resistor 66 connected in series to the thermistor 24, which has its own resistance value varied in accordance with the variation in kettle temperature, also increases by degrees as shown in FIG. 4 by a curve 92.

The cooking operation controller 80 detects, in accordance with the digital data signal Sa from the A/D converter 68, that the actual kettle temperature has reached a predetermined setting temperature for commencement of the rice immersion step, $T_P$ (° C.) (for example, 45° C.). At this time, the controller 80 makes the heater switch 42 on and off so as to maintain the kettle temperature at the immersion-setting temperature $T_P$ for a specified period of time $t_2$ to $t_3$, to permit a sufficient amount of water to be absorbed into the rice. During the execution $t_2$ to $t_3$ of the immersion step, only the first display section 30a of the display device 30 is lit, as shown in FIG. 5A, to inform the operator that the rice immersion step is in execution.

When the time $t_3$ is reached at which the immersion step is completed, the cooking operation controller 80 again continuously supplies a logic level "1" signal to the AND gate 62 from its first output terminal $O_1$. Accordingly, the heater switch 42 is rendered conductive by the switch driver 46 to thereby continuously energize the cooking heater 20. Thus, the kettle 18 containing rice and water is heated again by the heater 20 on a continuous basis. Thus, the main cooking operation is begun. Accordingly, the kettle temperature is allowed to rise as shown in FIG. 3 by a numeral 94. On the other hand, the display device 30 is correspondingly driven by the driver circuit 84 so that only the second display section 30b shows such a display, as shown in FIG. 5B. The operator is thereby informed that the cooking process has transferred from the rice immersion step to the main cooking step. Corresponding to the rise in the actual kettle temperature due to the commencement of the main cooking step, the output voltage $V_R$ of the resistor 66 also increases as shown in FIG. 4 by curve 96. Accordingly, the data signal Sa from the A/D converter 68 can be regarded as representing the actual kettle temperature.

When the main cooking step continues to be executed in the above-mentioned manner and when, at time $t_4$, for example, the temperature of the kettle 18 reaches a specified cooking-completion temperature or dry-up state temperature $T_{OFF}$ (115° C.), the controller 80 de-energizes the heater 20 to complete the main cooking step and then transfers the cooking process from this main cooking step to the next auxiliary cooking step, or the above-mentioned ripening step. In this ripening step, the kettle 18 is intermittently heated by the cooking heater 20 so that the kettle 18, under the control of the cooking operation controller 80, is kept at a temperature within the temperature zone defined between the cooking-completion temperature $T_{OFF}$ and a predetermined temperature $T_A$ (102° C.) lower than the cooking-completion temperature $T_{OFF}$. In the ripening step, the third display section 30c is driven to display as shown in FIG. 5C. Thereafter, when a predetermined length of time lapses from the time $t_4$ and a time $t_5$ is reached at which the ripening step is completed, the controller 80 completes the ripening step and transfers the cooking process from this ripening step to the warming step. That is, the controller 80 controls the heater 20 in such a manner as to intermittently energize a warming heater (not shown) and thereby keeps the kettle 18 near a specified temperature of, for example, 71° C. During this warming step, the fourth display section 30d is driven to display, as shown in FIG. 5D, that the rice cooker is in the warming step.

When, during the above-mentioned execution of the cooking steps, the thermistor 24 is disconnected and it is impossible to measure the actual kettle temperature, this connection failure is detected and the heater 20 is automatically deenergized in the following manner.

That is, the pulse counter 50 having already started its timer operation from the time $t_1$ for commencement of the cooking operation generates a logic level "1" signal from its output terminal when a predetermined time preset for the pulse counter 50, for example 3 minutes, has lapsed from that time $t_1$. This signal is supplied to the set input terminal 54s of the R-S flip-flop 54, thereby setting this flip-flop 54. Accordingly, the flip-flop 54 supplies a logic level "1" signal to one input terminal of the AND gate 56. If, at this time, the thermistor 24 has already fallen into a connection or disconnection failure, a voltage $V_R$ across the ends of the resistor 66 connected in series to this thermistor 24 decreases rapidly to a value of substantially zero. On the other hand, the memory 78 is previously stored, as mentioned above, with the voltage value appearing at the ends of the resistor 66 in correspondence to the ambient temperature (for example, 10° C.) prevailing at the time $t_1$ of commencement of the cooking operation, namely the primary voltage value $V_{R0}$. Accordingly, the digital data Sa outputted from the A/D converter 68 which represents the voltage value $V_R$ having a decreased value at the time of connection failure in the thermistor 24 becomes equal to or smaller than the digital data Sb outputted from the memory 78 which represents the primary voltage value $V_{R0}$. Accordingly, the comparator 70 produces a logic level "1" signal and supplies this signal to the other input terminal of the AND gate 56. Since the logic level "1" signals are supplied to the two input terminals of the AND gate 56 respectively, the output of this AND gate 56 becomes a logic level "1" signal. The output signal of logic level "1" generated from the AND gate 56 is supplied to the set input terminal 58s of the flip-flop 58, thereby setting the same. Accordingly, a logic level "1" signal is generated from the flip-flop 58 and is inverted by the inverter 60 and is thus inputted as a logic level "0" signal, to the next stage AND gate 62. At this time, the output of the AND gate 62 has a logic level "0", in response to which the switch driver 46 causes the heater 42 to open. As a consequence, the cooking heater 20 is deenergized with the result that the kettle heating is stopped. Further, the logic level "1" signal from the flip-flop 58 is also supplied to the driver circuit 84, and, in response to this signal, the driver circuit 84 drives the display device 30 as shown in FIG. 5E and also drives the buzzer circuit 86 to cause a buzzing, thereby informing the operator that the cooking operation has stopped due to thermistor failure.

While the invention is constructed such that the above-mentioned thermistor-disconnection detecting operation is not performed compulsorily during a specified time interval $T_N$ (FIG. 4) counted from the cooking operation starting time $t_1$, but is only effected after the lapse of this time interval $T_N$ under the control of the pulse counter 50. The reason for this is that the voltage $V_R$ (which corresponds to the actual temperature of the kettle 18 measured by the thermistor 24) across the ends of the thermistor disconnection detecting resistor 66, as shown in FIG. 4, is very low during the time interval $T_N$ immediately after the commencement of the cooking operation in which the kettle temperature is equal to the ambient temperature thereof. The amount of variation of that voltage with respect to the variation in temperature of the kettle 18 is also extremely small during the time interval $T_N$. This is attributable to the fact that the resistance value of the thermistor 24 varies exponentially with respect to the temperature. In a temperature zone where the amount of variation in the resistance value of the thermistor 24 with respect to temperature is relatively large, in other words, a temperature zone where the thermistor 24 has high sensitivity to the temperature variation, the thermistor 24 is required for detecting a high temperature of around 100° C. in order to determine the main cooking completion time. For this reason, construction is unavoidably made such that the output voltage $V_R$ of the resistor 66 becomes low for the time interval $T_N$ during which the kettle 18 is kept at a low temperature) If the above-mentioned thermistor disconnection detection is effected throughout the entire period of time after the commencement of the cooking operation, the fact that the output voltage of the resistor 66 obtained during that period of time in which the kettle temperature is substantially equal to the ambinent temperature of the kettle, will be misjudged as being a connection failure in the thermistor 24. Accordingly, a connection failure in the thermistor 24 is indicated. This is not desirable since it results in a decrease in reliability of the detecting function. According to the invention, however, control is made, by the pulse counter 50, such that the disconnection detection for the thermistor 24 is rendered ineffective during the time interval $T_N$ in which there is a high possibility that such a misjudgement occurs; namely, the time interval $T_N$ immediately after the commencement of the cooking operation (in other words, immediately after the commencement of the immersion step) in which the actual temperature of the kettle is low. According to the present invention, even if there is a connection failure in the thermistor 24 during the time interval $T_N$, detection of this connection failure is not made, and accordingly, the supply of power to the heater 20 continues independently of such a failure of the thermistor 24. However, this does not present a problem in using the rice cooker. This is because, even if the kettle 18 is heated during the time interval $T_N$ in spite of the connection failure in the thermistor 24, there will be no undesirable effect such as scorching of rice, since the kettle temperature per se is maintained at a low level, and also because it is impossible for the fuse 44 to melt, or for a secondary electric breakdown of the rice cooker due to, for example, overheating the kettle 18. When, as in this invention, the detection of the thermistor disconnection is rendered effective only after the lapse of the specified time interval $T_N$ determined by the pulse counter 50 immediately following the commencement of the rice cooking operation, the kettle heating operation of the heater 20 is stopped immediately after the detection. Thus, it is possible to provide a rice cooker which is safe, even when it becomes impossible to measure the actual kettle temperature to prevent the occurrence of a secondary electrical accident. Further, according to the present invention, the function of detecting the thermistor disconnection and stopping the heater operation soon thereafter is performed with high reliability mainly by the operation of the comparator 70. This comparator 70 can be easily integrated into a single microprocessor chip, together with the cooking operation controller 80. Accordingly, it is possible to prevent an increase in the number of parts and a concomitant increase in manufacturing cost of the rice cooker.

Although the present invention has been shown and described with respect to a particular embodiment, various changes and modifications which are obvious to a person skilled in the art to which the invention pertains are deemed to lie within the spirit and scope of the invention. In the above-mentioned embodiment, the construction is made, as shown in FIG. 2, such that the reference data for use in processing of the comparator 70 is obtained, for each rice cooking, by measuring the primary output voltage value $V_{R0}$ of the resistor 66 for detecting the thermistor disconnection. This data is stored in the memory 78. However, the invention is not limited thereto, but arrangement may be made such that the reference value is set at an optimum value when the rice cooker is designed, thereby fixing the reference value to a specified value. In this case, the A/D converter 72 and the controller 80 becomes unnecessary and a ROM may serve as said memory, thereby simplifying the construction. In this modification, construction is made such that, for example, the data memory 5 such as ROM connected to the comparator 70 is prestored with a digital reference data corresponding to the voltage value appearing at the ends of the resistor 66 when the measured temperature of the thermistor 24, or the actual kettle temperature, is 10° C.

What we claim is;

1. An electric rice cooker comprising:

a cooking kettle for containing rice and water;

electric cooking heater means, provided adjacent to the outside surface of said kettle, for heating said kettle and the contents thereof;

thermally insulative housing means, having a removable lid member, for supporting therein said kettle and said heater means;

measuring means for measuring the actual temperature of said kettle, said measuring means including a thermally sensitive resistor having its resistance value varied in accordance with the variation of said kettle temperature and producing an electrical measurement signal corresponding to the actual kettle temperature;

cooking control means connected to said measuring means and said heater means, for energizing said heater means a first time so as to start the rice cooking operation and for controlling the supply of power to said heater means in response to said measurement signal, thereby controlling the heating of said kettle by said heater means so as to cause and effective execution of the rice cooking operation; and emergency circuit means connected to said measuring means and said heater means, for detecting that said measurement signal decreases to a level lower than a specified reference signal level due to a connection failure in said thermally sensitive resistor, and for deenergizing said heater means independently of said control means so as to stop the rice cooking operation, said emergency circuit means having its operation rendered effective from a second time attained after a specified time interval has lapsed from the first time.

2. The electric rice cooker according to claim 1, wherein said emergency circuit means comprises:

first circuit means connected to said thermally sensitive resistor, for measuring, for each rice cooking, a primary output voltage of said thermally sensitive resistor obtained at said first time and for generating a data signal representing the primary output voltage value as said reference signal level;

memory means connected to said first circuit means, for receiving said data signal and for storing therein the primary output voltage value to generate this voltage value; and second circuit means for receiving the measurement signal and the data signal and for comparing the signals to each other to produce a detection signal when the level of the measurement signal becomes lower than the primary output voltage value.

3. The electric rice cooker according to claim 2, wherein said emergency circuit means further comprises:

third circuit means for starting its counting operation from the first time and for generating an electrical timer signal at a time when the specified time interval between the first time and the second time has lapsed, that is at the second time; and fourth circuit means connected to said second circuit means and said third circuit means, for supplying a heating-operation stopping command signal to said heater means only when said fourth circuit means receives the detection signal and the timer signal at the same time.

4. The electric rice cooker according to claim 3, wherein said emergency circuit means still further comprises alarm means, connected to said fourth circuit means, for buzzing in response to the heating-operation stopping command signal.

5. The electric rice cooker according to claim 4, wherein said measuring means comprises:

a resistor element connected in series to said thermally sensitive resistor and having a peculiar resistance value; and DC voltage generating means for supplying a constant DC voltage between said thermally sensitive resistor and said resistor element.

6. The electric rice cooker according to claim 1, wherein said measuring means comprises:

a resistor element connected in series to said thermally sensitive resistor and having a peculiar resistance value; and DC voltage generating means for supplying a constant DC voltage between said thermally sensitive resistor and said resistor element.

7. The electric rice cooker according to claim 6, wherein said emergency circuit means comprises:

first analog-to-digital converter means for measuring that voltage across the ends of said resistor element which has its value varied in accordance with the variation in the resistance value of said thermally sensitive resistor and for producing a first digital signal corresponding to the voltage thus measured;

second analog-to-digital converter means for measuring a primary voltage across the ends of said resistor element in accordance with the resistance value of said thermally sensitive resistor which measures the actual kettle temperature substantially equal, at the first time, to room temperature and for producing a second digital signal corresponding to the primary voltage thus measured serving as the reference level; and comparator means for receiving the first and second digital signals and for generating a detection signal of first logic level when said voltage value represented by the first digital signal is equal to or smaller than the primary voltage value represented by the second digital signal.

8. The electric rice cooker according to claim 7, which further comprises cooking switch means provided on the outer surface of said housing so as to be manually operable by an operator for generating a first logic level signal when said cooking switch means is a actuated by the operator for starting the cooking operation.

9. The electric rice cooker according to claim 8, wherein said emergency circuit means further comprises:

pulse counter means connected to said cooking switch means which, upon receipt of the first logic level signal at the first time, is reset to start its timer operation and, when a predetermined time interval has lapsed, generates a timer signal at its output terminal;

first flip-flop means connected to the output terminal of said pulse counter means and said cooking switch means which, upon receipt of the first logic level signal, is reset and, upon receipt of the timer signal at a time thereafter, is set to generate the first logic level signal;

an AND gate connected to said first flip-flop means and said comparator means; and second flip-flop means connected to said cooking switch means and said AND gate which, when said flip-flop means receives the first logic level signal from said cooking switch means, is reset and, when the output signal of said AND gate has first logic level, is set to invert the logic level of its output signal.

* * * * *